United States Patent
Katibah et al.

(10) Patent No.: US 7,472,109 B2
(45) Date of Patent: Dec. 30, 2008

(54) METHOD FOR OPTIMIZATION OF TEMPORAL AND SPATIAL DATA PROCESSING

(75) Inventors: Edwin Katibah, Lafayette, CA (US); Martin Siegenthaler, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 10/331,911

(22) Filed: Dec. 30, 2002

(65) Prior Publication Data

US 2004/0128314 A1    Jul. 1, 2004

(51) Int. Cl.
*G06F 17/30* (2006.01)

(52) U.S. Cl. .......................... 707/3; 707/103

(58) Field of Classification Search ............... 707/100, 707/104.1, 3, 103; 711/100; 701/117, 201, 701/209, 210; 342/367; 382/109, 318; 715/500.1
See application file for complete search history.

(56) References Cited

U.S. PATENT DOCUMENTS

| | | | | |
|---|---|---|---|---|
| 5,793,904 | A | | 8/1998 | Clapp et al. ............... 382/318 |
| 5,983,251 | A | | 11/1999 | Martens et al. ............ 708/203 |
| 6,014,614 | A | * | 1/2000 | Herring et al. ............ 702/196 |
| 6,147,644 | A | | 11/2000 | Castles et al. ............. 342/367 |
| 6,161,105 | A | * | 12/2000 | Keighan et al. ............ 707/100 |
| 6,201,884 | B1 | | 3/2001 | Van Bemmel et al. ....... 382/109 |
| 6,324,466 | B1 | | 11/2001 | Vieweg et al. ............. 701/117 |
| 6,401,102 | B1 | | 6/2002 | Ishii et al. ............... 707/104.1 |
| 6,430,547 | B1 | | 8/2002 | Busche et al. ............. 707/1 |
| 6,772,142 | B1 | * | 8/2004 | Kelling et al. ............. 707/3 |
| 6,895,329 | B1 | * | 5/2005 | Wolfson .................. 701/209 |
| 2002/0032697 | A1 | | 3/2002 | French et al. ............. 715/500.1 |
| 2002/0035432 | A1 | * | 3/2002 | Kubica et al. ............. 702/5 |
| 2002/0055924 | A1 | | 5/2002 | Liming .................. 707/100 |
| 2002/0062193 | A1 | * | 5/2002 | Lin ..................... 701/208 |
| 2002/0069312 | A1 | | 6/2002 | Jones ................... 711/100 |
| 2002/0087570 | A1 | * | 7/2002 | Jacquez et al. ............ 707/100 |
| 2002/0143462 | A1 | | 10/2002 | Warren .................. 701/200 |
| 2002/0146166 | A1 | | 10/2002 | Rao et al. |
| 2002/0147729 | A1 | * | 10/2002 | Balfour .................. 707/104.1 |
| 2002/0174124 | A1 | * | 11/2002 | Haas et al. ............... 707/100 |
| 2003/0069693 | A1 | * | 4/2003 | Snapp et al. .............. 701/213 |

OTHER PUBLICATIONS

Sokolov, Alexander, and Wulff, Fredrik, "Time Series—a web application for oceanographic data analysis," Jan. 14, 1998, Department of Systems Ecology, Marine Ecosystem Modeling Group, Stockholm University, WWW Page, http://data.ecology.su.se/models/BEDonWeb/Articles/TimeSeries.*

(Continued)

*Primary Examiner*—Don Wong
*Assistant Examiner*—Sheree N Brown
(74) *Attorney, Agent, or Firm*—Janaki K. Davda; Konrad Raynes & Victor LLP (57) ABSTRACT

Disclosed is a method for processing temporal data. A spatial query is received specifying a mapping function that identifies a set of temporal values for one or more objects. Geographic positions are automatically extracted from each set of temporal values for each of the one or more objects. Point objects are generated from the geographic positions. One or more spatial objects are generated from the point objects.

7 Claims, 6 Drawing Sheets

OTHER PUBLICATIONS http://mathworld.wolfram.com/Argument.html.*

"Graph Wavelets fro Spatial Traffic Analysis," by Mark Crovella and Eric Kolaczyk, [online] [retrieved on Feb. 11, 2005]. Retrieved from http://www.cs.bu.edu/techreports/pdf/2002-020-graph-wavelets.pdf.

PCT International Search Report for International Application No. PCT/GB03/05513 filed on Dec. 17, 2003.

INFORMIX Press. "*Informix TimeSeries DataBlade Module..*". User's Guide. Version 3.1—Excerpt. Apr. 1997, Part No. 000-3718. Title Page; Copyright Page; Table of Contents (6 p p. iii-viii); 7-39 to 7-41; 7-159 to 7-162.

Olson, M.A. et al. "*DataBlade Extensions for INFORMIX-Universal Server.*" COMPCON '97. Proceedings, IEEE, San Jose, CA, USA Feb. 23-26, 1997. IEEE Comput. Soc., US, Feb. 23, 1997, pp. 143-148.

Martin, R. D. et al. "*The S-Plus DataBlade for INFORMIX-Universal Server. The Natural Wedding of an Object Relational Database with an Object-Oriented Data Analysis Engine.*" Scientific and Statistical Database Management, 1997. Proceedings, Ninth International Conference on Olympia, WA, USA Aug. 11-13, 1997. IEEE Comput. Soc., US, Aug. 11, 1997, pp. 126-130.

European Office Action, Oct. 10, 2005, for European Application No. 03 768 011.3.

PCT Written Opinion, May 5, 2004, for International Application No. PCT/GB03/05513.

Response to PCT Written Opinion, Sep. 24, 2004, for International Application No. PCT/GB03/05513.

EP Office Action, Feb. 12, 2007, for European Patent No. 03 768 011.3-2001.

Communication Pursuant to Article 96(2) EPC dated Oct. 10, 2005 for Application No. 03 768 011.3-2201.

* cited by examiner

METHOD FOR OPTIMIZATION OF TEMPORAL AND SPATIAL DATA PROCESSING

BACKGROUND OF THE INVENTION

1. Field of the Invention

The present invention is related to temporal and spatial data processing.

2. Description of the Related Art

The Global Positioning System is a set of satellites that orbit the earth and make it possible for people with ground GPS receivers to pinpoint their geographic location. The GPS is owned and operated by the U.S. Department of Defense but is available for general use around the world.

At any given time, four satellites from the set of satellites are above the horizon. Each satellite contains a computer, an atomic clock, and a radio. Each satellite has an understanding of its orbit and has a clock. With this, each satellite continually broadcasts its changing position and time. On the ground, each GPS receiver contains a computer that "triangulates" its position by getting bearings from three of the four satellites. The result is a geographic position in the form of a longitude and latitude.

As the GPS receiver continuously triangulates a position, the result is a set of values, referred to as GPS data. Each value provides a longitude and latitude for a time. The GPS data may be stored in a table as "timeseries" data (i.e., timeseries refers to a datatype available in an IBM® Informix® TimeSeries DataBlade® module from International Business Machines Corporation). Timeseries data includes GPS data for a particular type of object (e.g., a car). Moreover, if four or more satellites can be received, the GPS receiver may also include the capability to determine an altitude, in addition to longitude and latitude.

With the proliferation of GPS receivers, more temporal spatial applications are being developed. For example, a temporal application might use timeseries data to identify all stock trades on a company between 4:00 p.m. and 5:00 p.m. A spatial application may use the timeseries data to identify how far a car has traveled between 4:00 p.m. and 5:00 p.m.

Temporal/spatial applications are able to perform many functions, such as: document how many stops a truck makes on a route; determine whether and when an individual's car left a certain location (e.g., a school campus) and whether and when the car returned; determine when a container was loaded onto a ship, where the container stopped while traveling on the ship, and how long before the container arrives at a destination (e.g., a port); determine when connecting flights arrive at an airport; and, determine whether a taxi arrived at a particular location at a particular time.

Figure 1:
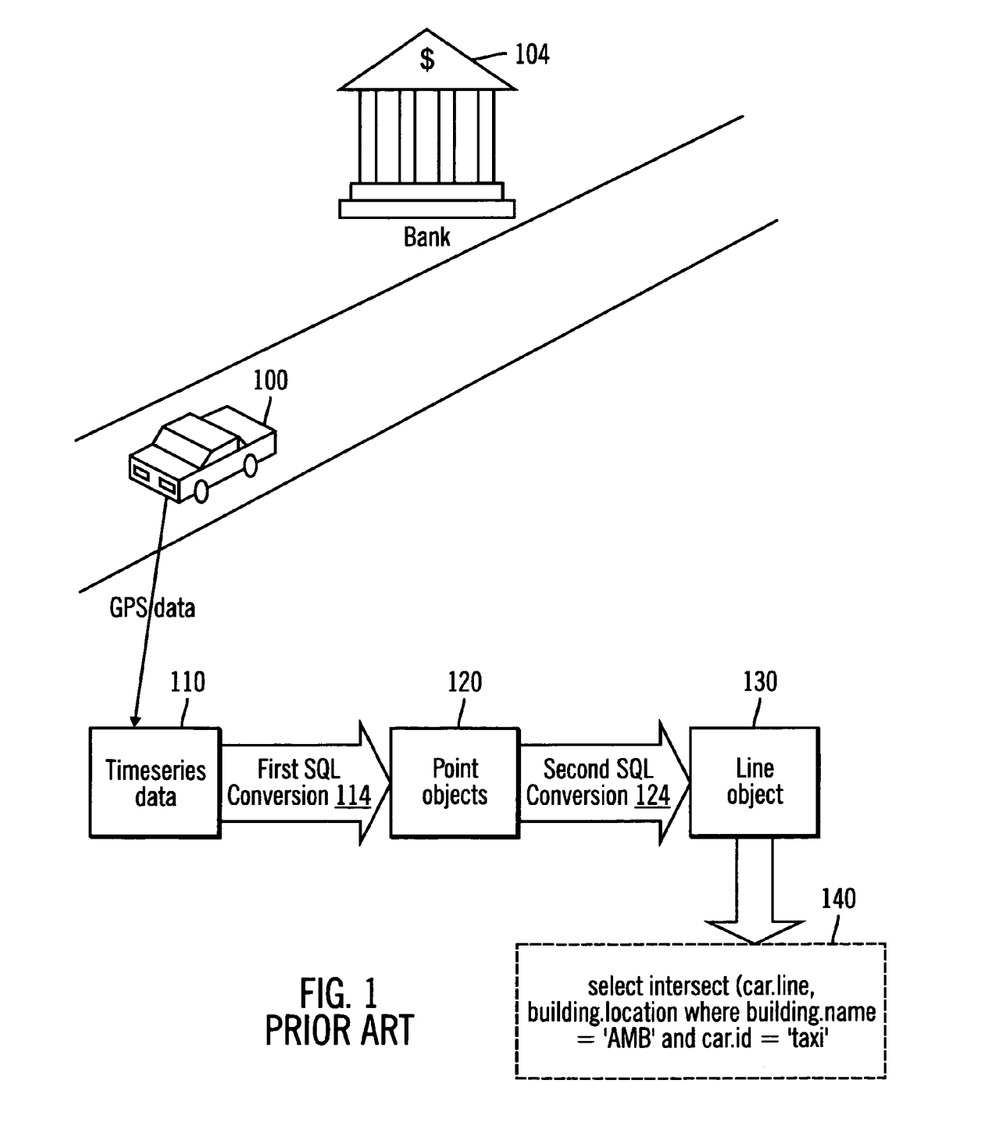
FIG. 1 illustrates prior art processing by a user to convert time data to spatial data that may be queried with a spatial query.

FIG. 1 illustrates prior art processing by a user to convert time data to spatial data that may be queried with a spatial query. In this example, in FIG. 1, a user desires to submit a Structured Query Language (SQL) request that determines whether a car 100 passed in front of a specific bank 104. Relational DataBase Management System (RDBMS) software uses a Structured Query Language (SQL) interface. The SQL interface has evolved into a standard language for RDBMS software and has been adopted as such by both the American National Standards Institute (ANSI) and the International Standards Organization (ISO).

The car 100 has a GPS receiver that calculates GPS data and a computer system that routes the GPS data to a server (not shown). The user loads the GPS data into a table to create timeseries data 110. Table 1 illustrates a table of timeseries data. The table of timeseries data includes a time, a longitude, and a latitude for each row of the table. The longitude and latitude may be specified in degrees.

TABLE 1

| Time | Longitude | Latitude |
|---|---|---|
| 00:00:01 | 37 degrees | 37 degrees |
| ... | ... | ... |

The user converts the timeseries data 110 through a first SQL conversion 114 into point objects 120 that specify longitude and latitude (i.e., X, Y) values. With the SQL conversion, the user stores the time and point objects 120 into Table 2, which illustrates the data stored after creation of point objects.

TABLE 2

| Time | Point |
|---|---|
| 00:00:01 | (X, Y) |
| ... | ... |

The user converts the point objects 120 through a second SQL conversion 124 into a line object 130 that reflects a line of travel of the car 100. Table 3 illustrates that a single row of data is stored after a path is generated, and the row has a starting time and a path.

TABLE 3

| Time | Path |
|---|---|
| 00:00:01 | Point1, Point2, ... |

The line object 130 is a type of spatial object that may be queried with a spatial query 140. Therefore, after creating the line object 130, the user submits spatial query 140 to determine whether the line the car traveled intersects with the building location. Select statement (1) is the spatial query 140 submitted by the user and includes an intersect function. In select statement (1), the user specifies "car.line", which is the spatial object that the user created.

select intersect(car.line, building.location)     (1)
    where building.location where build.name = 'AMB' and car.id = 'taxi')

Thus, the real time location of the car 100 passes through a number of intermediate steps (i.e., first and second SQL conversions 114, 124) before a spatial query can be made against the time data. In addition, the majority of temporal functionality may be lost in the first SQL conversion 114. This solution stores timeseries data 110 for the car 100 in a database table, and queries (with first SQL conversion 114) the table to build point objects 120. The solution queries the point objects (which are results of the first SQL conversion 114) to generate the path object 130.

Thus, in temporal/spatial applications, data is loaded into a table of timeseries data and selection is done in the temporal domain. That is selection is based on time. The data is converted for use in a spatial domain. Then, analysis of the data and rendering of a spatial object is completed in the spatial domain. In instances in which significant amounts of data are loaded, an IBM® Informix® TimeSeries Real Time Loader (RTL) (available from International Business Machines Corporation) is used to load the data. To facilitate spatial processing, the data points are moved from the time series in the temporal domain to spatial points. The spatial points are then used to build line objects, which are then used for path analysis. This domain translation is time consuming, eroding the value of the timely data, as well as, creating redundancies.

Therefore, there is a need in the art for improved temporal/spatial data processing.

SUMMARY OF THE INVENTION

Provided are a method, system, and program for processing temporal data. A spatial query is received specifying a mapping function that identifies a set of temporal values for one or more objects. Geographic positions are automatically extracted from each set of temporal values for each of the one or more objects. Point objects are generated from the geographic positions. One or more spatial objects are generated from the point objects.

The described implementations of the invention provide a method, system, and program for improved temporal/spatial data processing.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

Implementations of the invention provide functions that move data from the temporal to spatial domain directly, thereby reducing the lag between collecting and using the data, as well as, eliminating redundancies.

Figure 2:
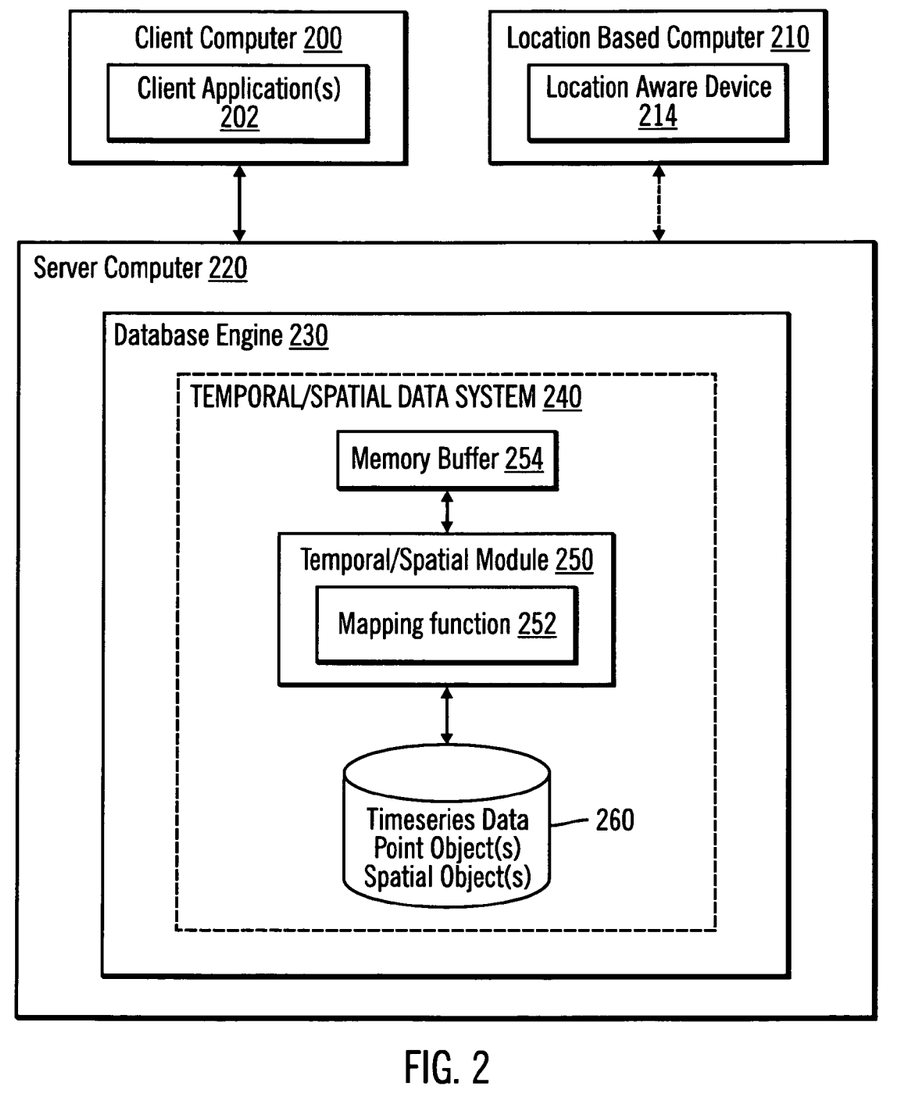
FIG. 2 illustrates, in a block diagram, a computing environment in accordance with certain implementations of the invention.

FIG. 2 illustrates, in a block diagram, a computing environment in accordance with certain implementations of the invention. A client computer 200 executes one or more client applications 202. A client application 110 may be any type of application program.

A location based computer 210 includes a location aware device 214, such as a GPS receiver. The location aware device 214 is capable of generating temporal values either continuously or periodically. In certain implementations, the temporal values include a time with an associated longitude, latitude. In certain implementations, the temporal values may also include other information, such as vehicle identification, speed of travel, etc. In certain implementations, the time intrinsically holds a date.

The client computer 200 is connected to a server computer 220 by a network, such as a local area network (LAN), wide area network (WAN), or the Internet. The location based computer 210 is connected via a wireless interface (e.g., cell phone or Cellular Digital Packet Data (CDPD) modem) to the Internet. The Internet is a world-wide collection of connected computer networks (i.e., a network of networks).

The location based computer 210 reads temporal values from the location aware device 214 and routes the temporal values to the server computer 220 via the wireless connection to the Internet. Although for ease of understanding, one location based computer 210 is illustrated, typically, multiple location based computers 210 are communicating with the server computer 220.

The server computer 220 includes a database engine 230, which includes temporal/spatial module 250, which processes a mapping function 252. The temporal/spatial module 250 may store data in memory buffer 254 during its execution. The database engine 230 also includes database 260, which includes timeseries data for one or more objects, one or more point objects, and one or more spatial objects. In particular, the temporal values for a particular object (e.g., a car) received from the location based computer 210 are stored in timeseries data. The temporal/spatial module 250 internally converts the timeseries data to point objects, and converts the point objects to spatial objects that may be processed with a spatial query by a client application 202. In certain implementations of the invention, the term "temporal/spatial data system" 240 is used to refer to the temporal/spatial module 250 and database 260.

In certain implementations, the database engine 130 may be an IBM® Informix® Dynamic Server (IDS), which is available from International Business Machines Corporation.

In certain implementations, the temporal/spatial module 250 is implemented as a server extension. Also, when a client application 220 submits a spatial query that includes mapping function 252 to server computer 220, the intermediate data used in processing the spatial query or the mapping function 252 is not moved between the client computer 200 and the server computer 220.

In certain implementations, the temporal/spatial module 250 is implemented utilizing MapInfo SpatialWare®, Spatial DataBlade® or Geodetic DataBlade® on an IBM® Informix® Dynamic Server.

In certain implementations, a new mapping function 252 is provided for optimized processing of timeseries data. The input to the mapping function 252 is a set of temporal values (i.e., a portion or all of timeseries data, which may also be referred to as a "clip") and zero or more additional arguments. In certain implementations, the additional arguments may include, for example, projection data. The output of the mapping function 252 is a path (i.e., a type of spatial object). In certain implementations, the mapping function 252 takes on the format of timeSeriesToPath function (2).

$$\text{timeSeriesToPath (<set of temporal values>,} \quad (2)$$
$$\text{<list of additional arguments>)}$$

Timeseries data for an object stores data for a particular type of object (e.g., a car) that produces temporal values with a location aware device (e.g., a GPS receiver). Temporal values include a time along with longitude, latitude values. In certain implementations, the set of temporal values is defined with a start time and an end time with reference to data stored in the timeseries data.

Figure 3:
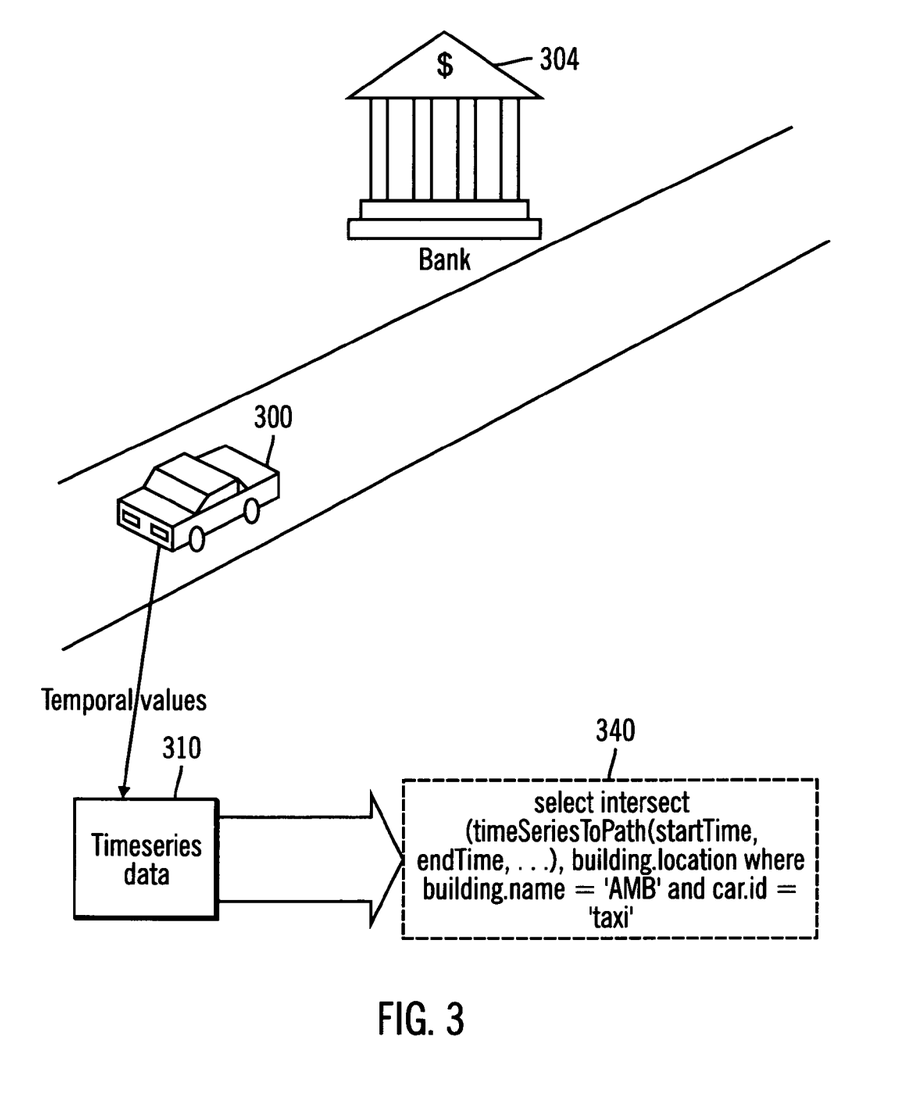
FIG. 3 illustrates, in a block diagram, use of a mapping function in a request that determines whether a car passed in front of a specific bank in accordance with certain implementations of the invention.

FIG. 3 illustrates, in a block diagram, use of a mapping function in a request that determines whether a car 300 passed in front of a specific bank 304 in accordance with certain implementations of the invention. In this example, in FIG. 3, a request is processed that determines whether a car 300 passed in front of a specific bank 304. The car 300 has a location aware device (e.g., a GPS receiver) that calculates temporal values and a computer system that routes the temporal values to a server (not shown). The temporal values for the car 300 are loaded into a table of timeseries data 310 at the server. Then, a spatial query may be submitted that references the timeseries data 310. That is, a user does not need to convert the timeseries data 310 into spatial data and query the spatial data. Instead, a spatial query 340 that includes a mapping function 252 may be submitted. The first argument of the mapping function specifies all or a portion of the timeseries data 310 (i.e., specifies a set of temporal values). For example, spatial query 340 is illustrated with select statement (3):

---
select intersect(timeSeriesToPath(startTime, endTime,...),      (3)
   building.location where build.name = 'AMB' and car.id = 'taxi')
---

Thus, the temporal/spatial data system 240 collapses the selection and conversion steps of the prior art (FIG. 1) into a single operation. The steps involved in the processing of temporal values have been reduced, redundant data has been eliminated, and the timeseries functionality is available for the select statement. This elimination of the intermediary steps reduces the lag time between the time the location data is added to the database and the time the location data is available as spatial data for querying.

Figure 4A:
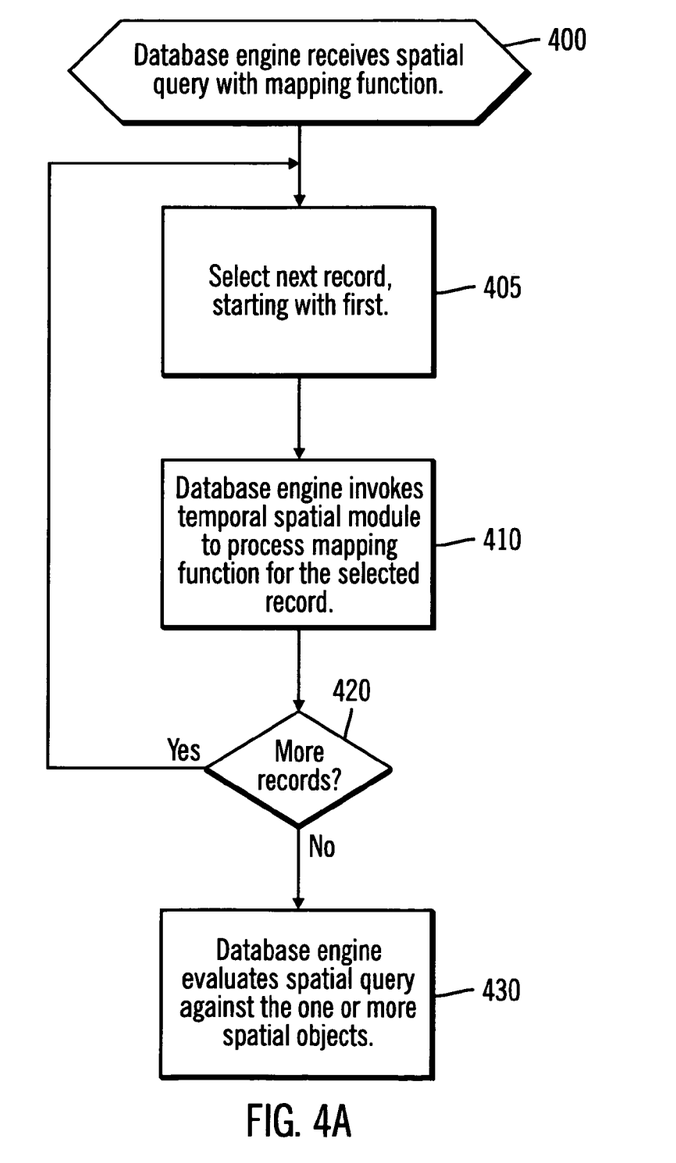
FIG. 4A illustrates logic implemented in a database engine in accordance with certain implementations of the invention.

FIG. 4A illustrates logic implemented in a database engine 230 in accordance with certain implementations of the invention. Control begins at block 400 with the database engine 230 receiving a spatial query with a mapping function 252. In block 405, the database engine 230 selects the next record to process for the query, starting with the first record. In block 410, the database engine 230 invokes the temporal/spatial module 250 to process the mapping function 252 for the selected record. In block 420, the database engine 230 determines whether there are additional records to process. If so, processing loops back to block 405, otherwise, processing continues to block 430. In block 430, the database engine 230 evaluates the spatial query against the one or more spatial objects.

Figure 4B:
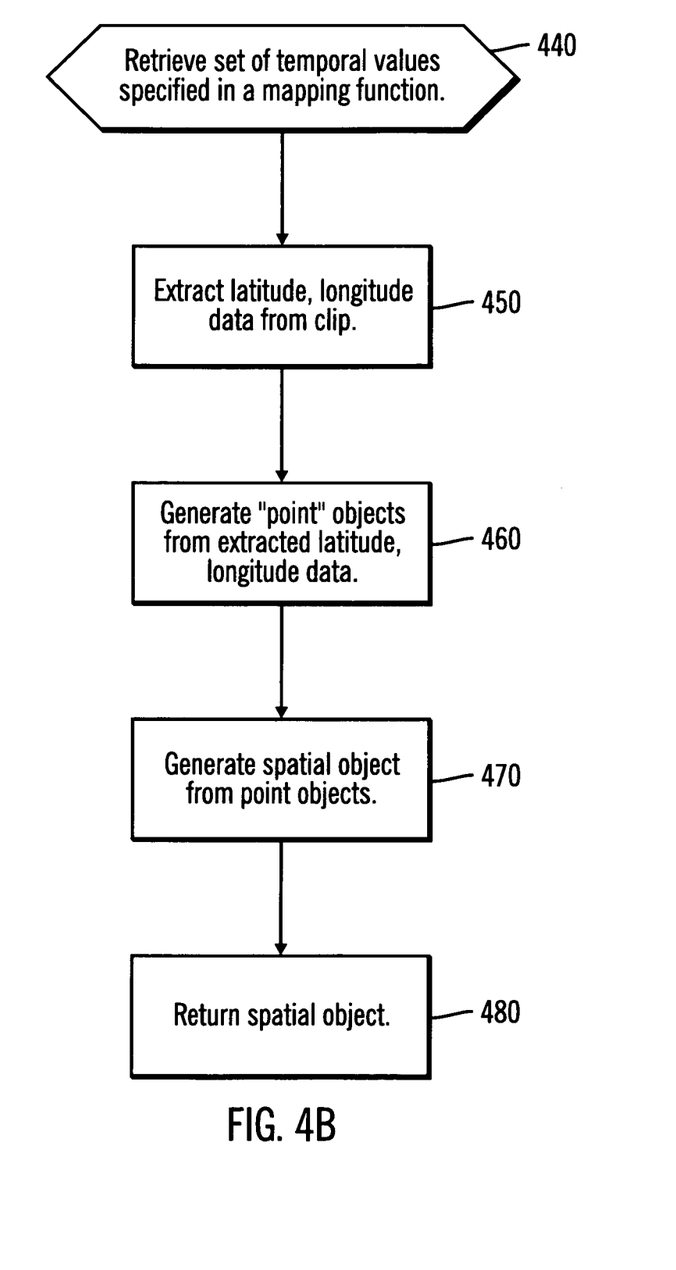
FIG. 4B illustrates logic implemented in temporal/spatial module in accordance with certain implementations of the invention.

FIG. 4B illustrates logic implemented in temporal/spatial module 250 in accordance with certain implementations of the invention. Control begins at block 440 with the temporal/spatial module 250 retrieving a set of temporal values (i.e., all or a portion of timeseries data for the object associated with the selected record) specified in a mapping function 252. In certain implementations, the set of temporal values is received as all or a portion of a table. In block 450, the temporal/spatial module 250 extracts longitude, latitude data (X, Y) from the temporal values in the timeseries data. In block 460, the temporal/spatial module 250 generates point objects. One point object is instantiated for each longitude, latitude pair in memory buffer 254 at the server 220. A point object is a type of spatial object and has two methods, one for latitude and one for longitude.

In block 470, the temporal/spatial module 250 generates a spatial object from the point objects. In different implementations, different types of spatial objects may be generated. In certain implementations, at least one spatial object is a path object that is instantiated for the set of point objects in memory 254 at the server 220. The path object is a type of spatial object and has methods, such as length and endpoint.

In block 480, the spatial object is returned. Then, a spatial query that includes a mapping function 252 may be evaluated against the one or more spatial objects that are returned as a result of evaluating the mapping function 252.

Thus, implementations of the invention avoid prior art processing that required building tables to convert temporal data to spatial data.

Select statement (3) references a single object (i.e., a taxi), but since a select statement is evaluated against database 160, the select statement may reference a group of objects, such as all taxis.

In select statement (4), car.id="Yellow Cab #123", and evaluation of the timeSeriesToPath function results in generation of one spatial object (for Yellow Cab #123) with a corresponding set of temporal values (i.e., all or a portion of the timeseries data selected in the timeSeriesToPath function). Select statement (4) is evaluated against the generated spatial object for the interval specified by the set of temporal values. Furthermore, evaluation of select statement (4) returns "true" if the building location and the path for the car having the identification "Yellow Cab #123" in the interval specified by the timeSeriesToPath function intersect.

---
select intersect(timeSeriestToPath(startTime, endTime,...),      (4)
   building.location where build.name = 'AMB' and
   car.id = 'Yellow Cab #123'
---

Since a select statement is executed by a database engine 230 (e.g., a RDBMS), a query such as select statement (5) may be submitted.

---
select car.id, intersect(timeSeriestToPath(startTime, EndTime,...),      (5)
   building.location where build.name = 'AMB' and car.type = 'taxi'
---

The evaluation of the timeSeriesToPath function in select statement (5) generates a spatial object for each car whose type is "taxi". For example, if there are six cars whose type is "taxi", then six spatial objects are generated. Each of the six spatial objects has associated timeseries data, and so each of the six spatial objects has a set of temporal values (i.e., all or a of the timeseries data selected in the timeSeriesToPath function). Then, select statement (5) is evaluated against each spatial object to return the car identifier (i.e., car.id) for cars of type taxi (i.e., car.type="taxi") and the result of the intersect function (which is either true or false). In particular, the evaluation of select statement (5) returns Table 4. In Table 4, the first column indicates the taxi identifier, and the second column indicates whether the taxi intersected with the building during the specified interval.

TABLE 4

| Taxi Identifier | Path of Taxi Intersected with Building |
|---|---|
| Yellow Cab #1 | false |
| Yellow Cab #2 | true |
| Joe's Taxi Service | false |
| You Drive Taxi | true |
| Red and Blue Taxi #16 | false |
| Udrive Bipedal Taxi | false |

In certain implementations, the mapping function takes on different formats to be compatible with vendor specific spatial products, and the spatial object composed in block 470 is dependent on the underlying spatial product. For example, if a vendor specific spatial product returned a line, the format of the mapping function 252 may be timeSeriesToLine( ), and the spatial object composed by the temporal/spatial module 250 would be a line object.

One product is an IBM® Informix® Geodetic DataBlade® module available from International Business Machines Corporation. If the Geodetic DataBlade® is installed, the "path" portion of the timeSeriesToPath function would be modified to represent the desired spatial object (e.g., GeoString, GeoPolygon, GeoString, etc.), and a corresponding spatial object would be composed by the temporal/spatial module 250. Another product is an IBM® Informix® Spatial DataBlade® module available from International Business Machines Corporation. If the IBM® Informix® Spatial DataBlade® module is installed, the mapping function 252 may reference the following spatial objects ST_LineString, ST_Multiline, ST_Polygon, etc., and the temporal/spatial module 250 would return the corresponding object. The "ST" prefix before an object name indicates that the object was defined by a standards body, Open GIS Consortium. More information on the Open GIS Consortium is available at http://www.opengis.org. The Mapinfo SpatialWare® module is a product from MapInfo Corporation, and in the instance of MapInfo SpatialWare® module, MapInfo SpatialWare's® implementation specific objects would be returned.

Select statement (6) illustrates a spatial query that includes a mapping function 252 for the car example of FIG. 3 when utilizing an ST_CROSSES function available from the IBM® Informix® Spatial DataBlade® module. The ST_CROSSES function determines whether geometries cross each other.

```
select ST_CROSSES(ST_BUFFER(building.location,50),     (6)
    TimeSeriesToLineString(withinR(track, '2001-07-01
       08:00:00.00000'::datetime year to fraction(5),
       'minute',
       45,
       'future'), 5)
from car_track, building
where building.name = 'BIG BANK' and car_track.id = 'taxi';
```

In select statement (6), the ST_BUFFER function (available from the IBM® Informix® Spatial DataBlade® module) identifies a buffer around a point. In this example, a radius of 50 is selected around a point representing a building's location. The mapping function 252 is TimeSeriesToLineString.

Evaluation of the withinR function results in a set of temporal values for an object. For the withinR function, a track identifies a particular table holding timeseries data for the object; a date and time text string "2001-07-01 08:00:00.00000" provides a starting time for the set of temporal values; "datetime year to fraction(5)" results in conversion of the date and time text string to a datatype of date-time with resolution of a factor of 5; minute represents an interval; the number 45 represents the size of the interval; and, "future" represents direction of time. In certain implementations, the interval may be: second, minute, hour, day, week, month, or year. In certain implementations, the direction may be future (i.e., the interval goes forwards from the starting time) or backwards (i.e., the interval goes backwards from the starting time). In select statement (6), the set of temporal values goes for a 45 minute interval, forward from the specified date and time. The number 5 represents projection for the mapping function and is an example of an additional argument (as was discussed with respect to mapping function (2)).

The result of processing the TimeSeriesToLineString( ) function is a spatial object. Then, the ST_CROSSES function evaluates whether the spatial object crosses the buffer around the point of the building location.

Select statement (7) illustrates a spatial query that includes a mapping function 252 for the car example of FIG. 3 utilizing a ST_OVERLAP function (available from the MapInfo SpatialWare® module). The ST_OVERLAP function returns TRUE if there are common points between two spatial objects.

```
select ST_OVERLAP(                                     (7)
    HG_CIRCLE(building.lat,building.lng, 50),
    TimeSeriesToPolyLine(withinR(track, '2001-07-01
       08:00:00.00000'::datetime year to fraction(5),
       'hour',
       8,
       'future'))
from car_track, building
where building.name = 'BIG BANK' and car_track.id = 'taxi';
```

In select statement (7), the HG_CIRCLE function (available from a MapInfo SpatialWare® module) identifies a circle of radius 50 around a point of a building specified by the latitude (building.lat) and longitude (building.lng). The mapping function 252 is TimeSeriesToPolyLine. Evaluation of the withinR function results in a set of temporal values for an object. In select statement (7), the set of temporal values goes for an 8 hour interval, forward from the specified date and time. In this case, the mapping function 252 receives a set of temporal values as an argument without any additional arguments.

The result of processing the TimeSeriesToPolyLine( ) function is a spatial object. Then, the ST_OVERLAP function evaluates whether the spatial object overlaps the buffer around the point of the building location.

Select statement (8) illustrates a spatial query that includes a mapping function 252 for the car example of FIG. 3 using the GeoPoint function (available from IBM® Informix® Geodetic DataBlade®). For the GeoPoint function, TRUE is returned if both the geospatial time ranges intersect and any point in the segment is less than or equal to the geodistance.

```
select within(                                         (8)
    GeoPoint((building.lat,building.lng), building.altitude, 'ANY'),
    TimeSeriesToGeoString(withinR(track, '2001-07-01
       08:00:00.00000'::datetime year to fraction(5),
       'day',
       1,
       'future'))
    50:geodistance)
from car_track, building
where building.name = 'BIG BANK' and car_track.id = 'taxi';
```

In select statement (8), the GeoPoint function (available from the IBM® Informix® Spatial DataBlade® module) identifies a point of a building specified by the latitude (building.lat) and longitude (building.lng). The altitude (building.altitude) is used to draw a sphere around the point of the building. The mapping function 252 is TimeSeriesToGeoString. Evaluation of the withinR function results in a set of temporal values for an object. In select statement (8), the set of temporal values goes for an 1 day interval, forward from the specified date and time. In this case, the mapping function 252 receives a set of temporal values as an argument without any additional arguments.

The result of processing the TimeSeriesToGeoString( ) function is a spatial object. Then, the within function evaluates whether the spatial object is within 50 units of the sphere generated by the GeoPoint function. The 50 units is specified with the "50:geodistance" argument of the within function.

Select statements (6), (7) and (8) derive the spatial object over different periods (e.g., minute, hour, day), but have the same starting time using the withinR timeseries function.

Moreover, select statements (6), (7) and (8) illustrate one data set being utilized in three different spatial environments. Without the benefit of the temporal/spatial data system 240, an administrator would have to manage three copies of data and convert each copy to a different format. Eliminating this redundant data frees both data and processing resources.

In summary, prior solutions were complex and had lower data throughput. On the other hand, the temporal/spatial data system 240 reduces the time temporary data spends in the server 220 from the time the timeseries data is loaded into database 260 and until the timeseries data is presented as a spatial object. Moreover, the temporal/spatial data system 240 reduces the amount of storage needed for intermediary data staging. The temporal/spatial data system 240 transforms data directly from the temporal to the spatial domain, thereby reducing time lag between receipt of the timeseries data to the time a spatial object is ready for querying.

In summary, implementations of the invention eliminate steps required by prior art systems to convert data from the temporal domain to the spatial domain in a "batch" mode. This makes the data more readily available, reducing the number of instances of data and making more timeseries functionality available during processing/analysis of the data. The data goes directly from a timeseries to a spatial object used in spatial analysis.

IBM, Informix, and DataBlade are registered trademarks or trademarks of International Business Machines Corporation in the United States and/or other countries. SpatialWare is a registered trademark or trademark of MapInfo Corporation in the United States and/or other countries.

Additional Implementation Details

The described techniques for maintaining information on network components may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission medium or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

The logic of FIGS. 4A-4B describe specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The illustrated logic of FIGS. 4A-4B was described as being implemented in software. The logic may be implemented in hardware or in programmable and non-programmable gate array logic.

Figure 5:
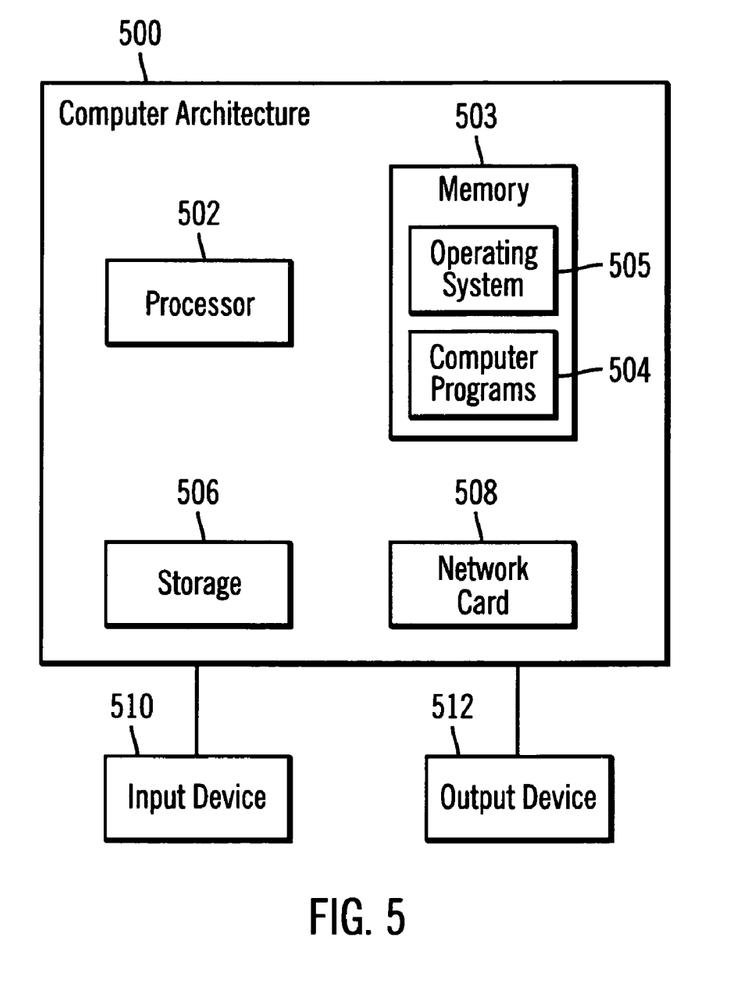
FIG. 5 illustrates one implementation of the architecture of the computer systems in accordance with certain implementations of the invention.

FIG. 5 illustrates one implementation of the architecture of the computer systems 200, 210, 220 in accordance with certain implementations of the invention. The computer systems 200, 210, 220 may implement a computer architecture 500 having a processor 502 (e.g., a microprocessor), a memory 503 (e.g., a volatile memory device), and storage 506 (e.g., a non-volatile storage area, such as magnetic disk drives, optical disk drives, a tape drive, etc.). An operating system 505 may execute in memory 503. The storage 506 may comprise an internal storage device or an attached or network accessible storage. Computer programs 504 in the storage 506 are loaded into the memory 503 and executed by the processor 502 in a manner known in the art. The architecture further includes a network card 508 to enable communication with a network. An input device 510 is used to provide user input to the processor 502, and may include a keyboard, mouse, pen-stylus, microphone, touch sensitive display screen, or any other activation or input mechanism known in the art. An output device 512 is capable of rendering information transmitted from the processor 502, or other component, such as a display monitor, printer, storage, etc.

The computer architecture 500 may comprise any computing device known in the art, such as a mainframe, server, personal computer, workstation, laptop, handheld computer, telephony device, network appliance, virtualization device, storage controller, etc. Any processor 502 and operating system 505 known in the art may be used.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for processing temporal data, comprising:
receiving a spatial query, wherein the spatial query includes a first function, wherein the first function includes as an argument a second function, wherein the second function includes an input argument that identifies a set of temporal values for each of one or more objects, wherein the set of temporal values comprises timeseries data for an associated object, and wherein the timeseries data provides, for each time of a series of times, a longitude value and a latitude value for the associated object, wherein output of the second function is one or more spatial objects;

for each record to process for the spatial query, invoking a module to process the second function for the selected record, wherein the second function is processed by:
(i) retrieving the set of temporal values associated with a selected record that were identified in the second function specified in the spatial query;
(ii) extracting geographic positions from the set of temporal values for each of the one or more objects, wherein the geographic positions comprise, for each time of the series of times in the retrieved set of temporal values, the longitude value and the latitude value;
(iii) generating point objects from the geographic positions, wherein each of the point objects specifies, for each time of the series of times in the retrieved set of temporal values, the longitude value and the latitude value; and
(iv) generating the one or more spatial objects from the point objects, wherein each of the one or more spatial objects includes one or more methods; and evaluating the spatial query by evaluating the first function against the one or more spatial objects that are returned as a result of evaluating the second function to output results.

2. The method of claim 1, wherein each set of temporal values comprises all of timeseries data for the associated object.

3. The method of claim 1, wherein each set of temporal values comprises a portion of timeseries data for the associated object.

4. The method of claim 1, wherein the one or more spatial objects are vendor specific.

5. The method of claim 1, wherein the mapping function receives the portion of the set of temporal values as an argument.

6. The method of claim 1, wherein each set of temporal values for the one or more objects is determined by evaluating a function.

7. The method of claim 1, wherein the function may have multiple arguments.

* * * * *